United States Patent
Nieh et al.

(10) Patent No.: US 11,815,613 B2
(45) Date of Patent: Nov. 14, 2023

(54) SYSTEM FOR RECOGNIZING THE LOCATION OF AN OBJECT AND METHOD THEREOF

(71) Applicant: TRACMO, INC., Taipei (TW)

(72) Inventors: Jong-Liang Nieh, Taipei (TW); Chang-Yi Wu, Taipei (TW); Szu-Ying Li, Taipei (TW)

(73) Assignee: TRACMO, INC., Taipei (TW)

( * ) Notice: Subject to any disclaimer, the term of this patent is extended or adjusted under 35 U.S.C. 154(b) by 38 days.

(21) Appl. No.: 17/351,278

(22) Filed: Jun. 18, 2021

(65) Prior Publication Data

US 2022/0317237 A1 Oct. 6, 2022

(30) Foreign Application Priority Data

Mar. 31, 2021 (TW) .................................. 110111759

(51) Int. Cl.
*G01S 3/02* (2006.01)
*G01S 5/02* (2010.01)
*G01S 5/06* (2006.01)
*G01S 5/08* (2006.01)

(52) U.S. Cl.
CPC ...... *G01S 5/02521* (2020.05); *G01S 5/02216* (2020.05); *G01S 5/0268* (2013.01); *G01S 5/06* (2013.01); *G01S 5/08* (2013.01)

(58) Field of Classification Search
CPC ............. G01S 5/02521; G01S 5/02216; G01S 5/0268; G01S 5/06; G01S 5/08
USPC ......................................................... 342/451
See application file for complete search history.

(56) References Cited

U.S. PATENT DOCUMENTS

| | | | | |
|---|---|---|---|---|
| 9,244,150 | B2* | 1/2016 | Sathish | G01S 5/02521 |
| 9,599,699 | B2* | 3/2017 | Zeng | G01S 1/08 |
| 9,820,233 | B2* | 11/2017 | Pakzad | G01S 5/0236 |
| 10,448,355 | B2* | 10/2019 | Reial | H04W 64/003 |
| 10,567,905 | B2* | 2/2020 | Edge | G01S 5/10 |
| 2016/0334498 | A1* | 11/2016 | Jamieson | G01S 5/02213 |
| 2019/0166453 | A1* | 5/2019 | Edge | G01S 5/06 |
| 2022/0057471 | A1* | 2/2022 | Padaki | G01S 5/0242 |
| 2022/0317236 | A1* | 10/2022 | Dongare | G01S 5/0236 |
| 2023/0232363 | A1* | 7/2023 | Nam | H04W 24/10 455/456.1 |

\* cited by examiner

*Primary Examiner* — Chuong P Nguyen
(74) *Attorney, Agent, or Firm* — Huan Yi Lin

(57) ABSTRACT

A system for recognizing the location of a subject, comprises a server, signal transceivers, and a tracking device. The server transmits a request and stores a map file. The signal transceivers respectively communicate with the server to receive the request, and broadcast a reference signal to the other signal transceivers. The tracking device bidirectionally communicates with the signal transceivers, and periodically sends a tracking signal. After each of the signal transceivers obtains the first received signal strength indicator corresponding to the received reference signal and the second received signal strength indicator corresponding to the received tracking signal, each transmits the first signal strength indicator and the second signal strength indicator to the server. The server determines relative position information for the at least one tracking device within the map file according to the first signal strength indicators, the second signal strength indicators, and location information from the signal transceivers.

13 Claims, 6 Drawing Sheets

SYSTEM FOR RECOGNIZING THE LOCATION OF AN OBJECT AND METHOD THEREOF

CROSS-REFERENCE TO RELATED APPLICATION

This application claims priority from Taiwan Patent Application No. 110111759 filed on Mar. 31, 2021, which are hereby incorporated herein by reference in its entirety.

BACKGROUND OF THE INVENTION

1. Field of the Invention

The present invention relates to a site location identification method and a system using the same, in particular to an object location identification method and system capable of automatic calibration.

2. Description of Related Art

The importance of site location techniques is gradually growing in applications such as logistic management, object management, and person monitoring. It is necessary to use such techniques to identify uncertain locations of some objects which need to be further located for these applications. When the site location is performed, common methods firstly mark the actual positions of several sensing points on a map. Furthermore, the actual distances between the sensing points and the scale of the map also need to be ascertained. Through the signal transmission and reception among the sensing points, the received signal strength indicator (RSSI) is derived separately from each received signal. Then, ratios are calculated based on the distances between the sensing points and the attenuations of the RSSIs. The distances from a movable target to the sensing points are just determined by the attenuations of the RSSIs to locate the movable target on the map.

Before the site location is performed, the locations of the sensing points have been already confirmed on the map, and the actual distances between the sensing points are also calculated according to the known scale. Moreover, it is necessary to manually calibrate locations between the sensing points and collect the signals from the sensing points and the distances between them, the signal from the movable target, the distance between the movable target and each sensing point, and so on. Then, all of the collected data are carefully tabled and arranged for calculation. Such traditional locating systems require a complex computing architecture and huge data computations to result in excessive construction costs. Furthermore, the continuous signal transmission and calculations during a locating process further require huge network transmission traffic, and even render the network bandwidth insufficient and jammed. If the object to be located is in motion, the accuracy of location will be greatly degraded, and the locating speed will also become slow.

SUMMARY OF THE INVENTION

In order to solve the foregoing problems, the application provides an object location identification system and a method thereof. Such a system or method lets proprietors who need to install a field location system in their buildings have a quick and easy installation and calibration way without excessive system installation and complicated computations. Furthermore, actual map scales are not required for calculation. Automatic calibration is performed between sensing points, and a backward calibration for few wrong-located sensing points is performed through a movable target. The location calibration may be finished under low resource consumption. The movable targets are more accurately located.

In view of the foregoing aspect, in one embodiment, the present application provides a system for recognizing the location of a subject, comprising: a server for transmitting a request and storing a map file; a plurality of signal transceivers respectively communicating with the server to receive the request and broadcasting a reference signal to others of the signal transceivers; and at least one tracking device bidirectionally communicating with the signal transceivers and periodically sending a tracking signal; wherein after each of the signal transceivers obtains a first received signal strength indicator corresponding to the received reference signal and a second received signal strength indicator corresponding to the received tracking signal, the each transmits the first signal strength indicator and the second signal strength indicator to the server, and the server determines relative position information for the at least one tracking device within the map file according to the first signal strength indicators, the second signal strength indicators, and location information from the signal transceivers.

In another embodiment, each of the signal transceivers comprises an antenna array which includes at least two antennas, and the signal transceivers can obtain the angles of arrival (AoAs) of the reference signals or the AoAs of the tracking signal through the antennas.

In another embodiment, the at least one tracking device further includes a motion sensing unit for sensing whether the at least one tracking device is in a static state or a motion state, wherein the server determines whether the at least one tracking device is in the static state or the motion state according to a signal generated from the motion sensing unit, and when the at least one tracking device is determined to be in the motion state, the server temporally stops identifying a relative location of the at least one tracking device.

In another embodiment, when the tracking device is determined to change from the motion state to the static state, the relative location of at least one tracking device is resumed to be identified.

In another embodiment, the tracking device further includes a physiological detection unit: for detecting a physiological signal of a user wearing the tracking device.

The present application further provides a method for recognizing the location of a subject, comprising: transmitting a request to a plurality of signal transceivers from a server; receiving the request at each of the signal transceivers and then broadcasting a reference signal from each of the signal transceivers to others; transmitting a first received signal strength indicator corresponding to the received reference signal from each of the signal transceivers to the server; periodically sending a tracking signal from at least one tracking device, and receiving the tracking signal at some of the signal transceivers and then transmitting a second received signal strength indicator corresponding to the received tracking signal from each of the signal transceivers to the server; and determining relative position information within a map file for the at least one tracking device in relative to the some of the signal transceivers according to the first signal strength indicators, the second signal strength indicators, and location information from the some of the signal transceivers.

In another embodiment, the signal transceivers can obtain the AoAs of the reference signals or the AoAs of the tracking signal through an antenna array.

In another embodiment, the method further comprises: sensing whether the at least one tracking device is in a static state or a motion state through a motion sensing unit; and temporally stopping identifying a relative location of the at least one tracking device when the at least one tracking device is determined to be in the motion state.

In another embodiment, when the tracking device is determined to change from the motion state to the static state, the relative location of at least one tracking device is resumed to be identified.

In another embodiment, the method further comprises: providing a calibration device with known location information, and broadcasting a backward tracking signal from the calibration device; receiving the signal transceivers at the signal transceivers and then transmitting each third received signal strength indicator corresponding to the received backward tracking signal to the server; and modifying at least one of the first signal strength indicators at the server according to the third received signal strength indicators.

Compared with conventional location systems and methods used in such systems, the application provides an object location identification system and a method thereof. The novel system does not require the actual scale of a map for a workplace. That is, the actual distances of the applied sites do not need to be ascertained. The application sends instructions or commands to each sensing point, and the calibrations between sensing points can be well performed automatically. Moreover, when errors occur due to undesired interferences or obstacles during the automatic calibrations, a calibration device with known location information is further used to broadcast a backward tracking signal outwardly, and the automatic calibrations can be modified through the received signal strength indicator of the backward tracking signal. In addition, the system can determine whether the movable target is moving now. The location identification is switched upon the motion or static state of the movable target to improve the accuracy of locations so that the resource of the system is saved and the network traffic is reduced.

BRIEF DESCRIPTION OF THE DRAWINGS

In order to sufficiently understand the essence, advantages and the preferred embodiments of the present invention, the following detailed description will be more clearly understood by referring to the accompanying drawings.

DETAILED DESCRIPTION OF THE INVENTION

The following description shows the preferred embodiments of the present invention. The present invention is described below by referring to the embodiments and the figures. Thus, the present invention is not intended to be limited to the embodiments shown, but is to be accorded the principles disclosed herein. Furthermore, that various modifications or changes in light thereof will be suggested to persons skilled in the art and are to be included within the spirit and purview of this application and scope of the appended claims.

Figure 1A:
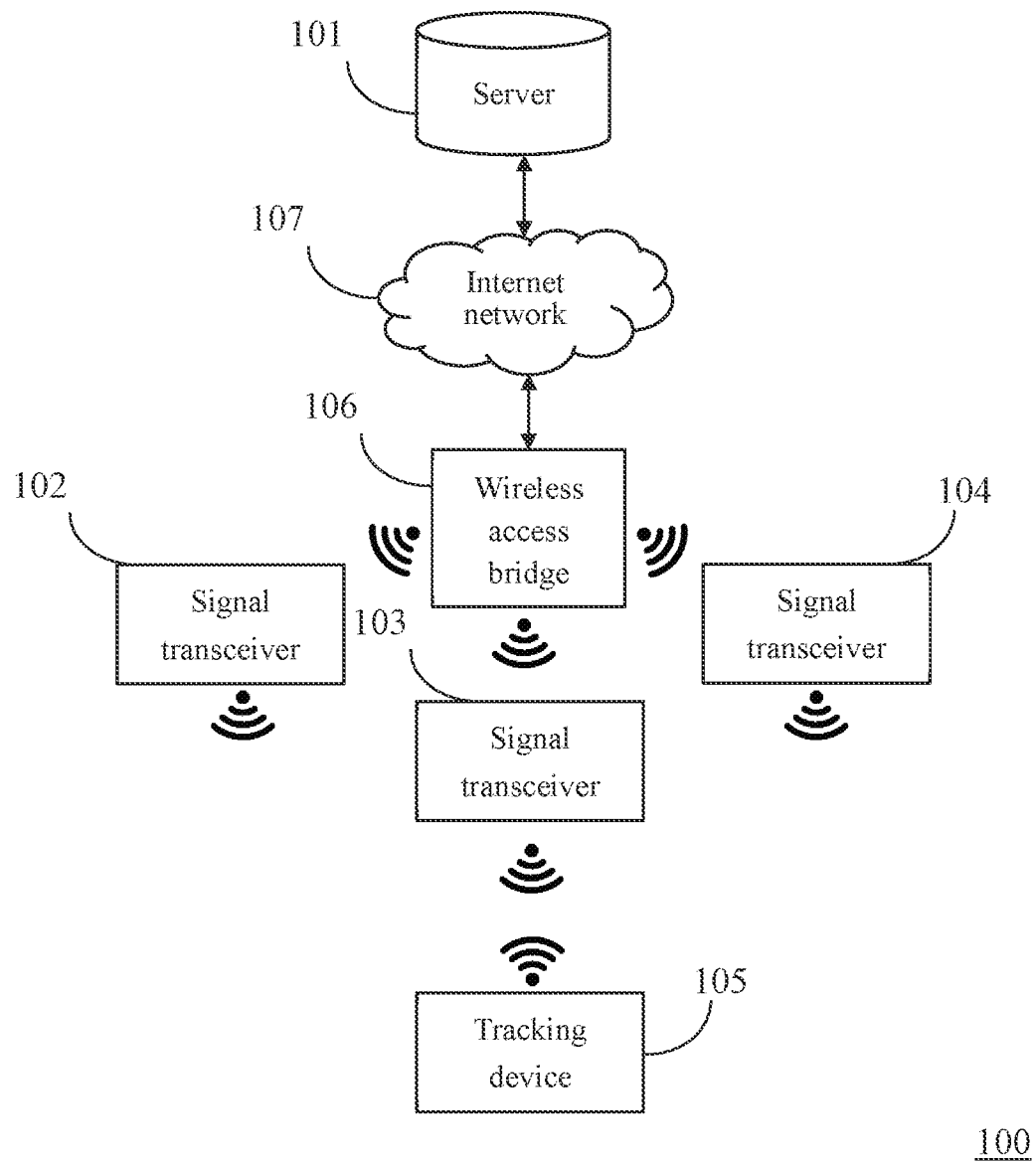
FIG. 1A is a block diagram showing the schematic configuration of the object location identification system according to the present application.
Figure 1B:
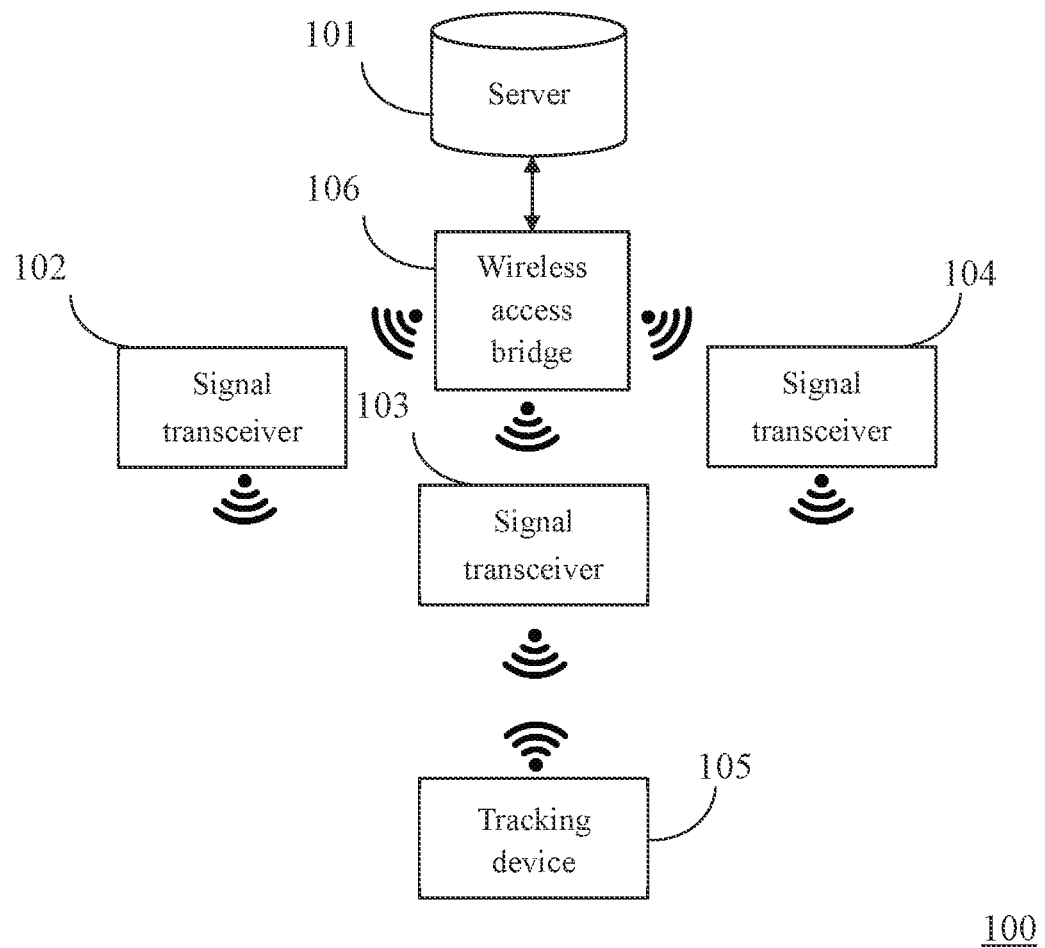
FIG. 1B is a block diagram showing the schematic configuration of the object location identification system according to another embodiment of the present application.

FIG. 1A is a block diagram showing the schematic configuration of the object location identification system according to the present application. In this embodiment, the object location identification system 100 comprises a server 101, a plurality of signal transceivers (102, 103, 104), at least one tracking device 105, and a wireless access bridge 106. The signal transceivers (102, 103, 104) and the wireless access bridge 106 can communicate with each other. For example, by transmitting wireless signals with a wireless hotspot (Wi-Fi), the wireless access bridge 106 communicates with the server 101 via an internet network 107. Furthermore, the tracking device 105 and the signal transceivers (102, 103, 104) can communicate with each other. For example, they may proceed to wireless signal transmission using Bluetooth communication protocols. The server 101, the signal transceivers (102, 103, 104), the tracking device 105, and the wireless access bridge 106 may be a computer, a computing device, a mobile device, or a network communication device. FIG. 1B is a block diagram showing the schematic configuration of the object location identification system according to another embodiment of the present application. In this embodiment, the wireless access bridge 106 can communicate with the server 101 without using the Internet network. The description and drawings of this embodiment are only exemplary, and the number of signal transceivers and that of tracking devices are not limited by the embodiment.

Figure 2:
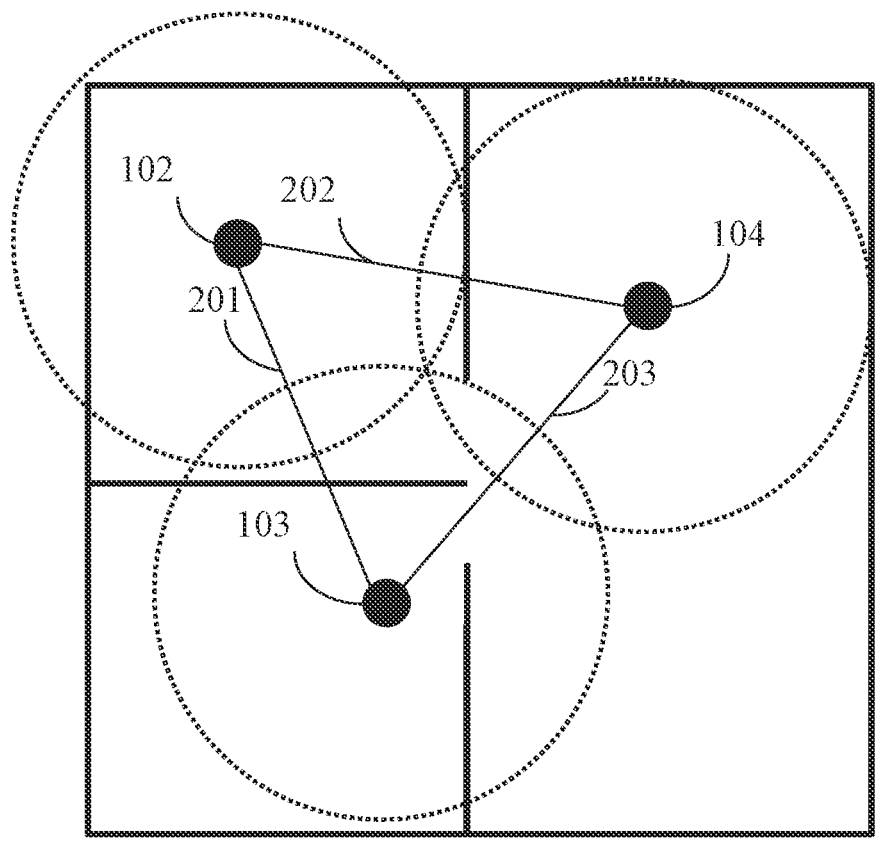
FIG. 2 is a schematic diagram showing an object location identification system displayed on a map file according to the present application.

The server 101 is used to send requests, perform trilateral positioning calculations, and store a map file to provide various location services. The map file shows the spatial configuration and geographic distribution of a site. Moreover, when the object location identification system 100 is built, the location information of the signal transceivers (102, 103, 104) is marked on the map file. For example, they are marked at above the door of a room 501 or the middle of the aisle wall outside the rooms 501 and 502, and their corresponding coordinates are stored in the server 101. As shown in FIG. 2, it is a schematic diagram showing an object location identification system displayed on a map file according to the present application. The signal transceivers (102, 103, 104) are used to receive the request and respectively broadcast reference signals to other signal transceivers. For example, the signal transceivers 103 and 104 respectively receive the reference signal broadcast from the signal transceiver 102, the signal transceivers 102 and 104 respectively receive the reference signal broadcast from the signal transceiver 103, and the signal transceivers 102 and 103 respectively receive the reference signal broadcast by the signal transceiver 104. The first received signal strength indicator is an indication of the power level of the reference signal being received by a wireless device such as the signal transceiver 104. For example, the signal transceiver 103 receives the reference signal a sent by the signal transceiver 102, and accordingly obtains a first received signal strength indicator a0; the signal transceiver 104 receives the reference signal a sent by the signal transceiver 102, and accordingly obtains a first received signal strength indicator a1. The signal transceiver 102 receives the reference signal b sent by the signal transceiver 103, and accordingly obtains a first received signal strength indicator b0; the signal transceiver 104 receives the reference signal b sent by the signal transceiver 103, and accordingly obtains a first received signal strength indicator b1. The signal transceiver 102 receives the reference signal c sent by the signal transceiver 104, and accordingly obtains a first received signal strength indicator c0; the signal transceiver 103 receives the reference signal c sent by the signal transceiver 104, and accordingly obtains a first received signal strength indicator c1. The signal transceivers (102, 103, 104) respectively transmit the first received signal strength indicators (a0, a1, b0, b1, c0, c1) of the received reference signal a, the reference signal b, and the reference signal c to the server 101.

The server 101 can calculate a relative distance between two points from the received signal strength indicators according to the physical formula of wireless signal attenuation with transmission distance. Accordingly, the server 101 obtains the relative distance 201 between the signal transceivers 102 and 103 through the first received signal strength indicators a0 and b0, the relative distance 202 between the signal transceivers 102 and 104 through the first received signal strength indicators a1 and c0, and the relative distance 203 between the signal transceivers 103 and 104 through the first received signal strength indicators b1 and c1. Thus, the server 101 can do calculation based on the known coordinates of the signal transceivers (102, 103, 104) and the derived relative distances and further confirm whether the received first signal strength indicators between the signal transceivers are abnormal or paradoxical. For example, there may be signal interferences or obstacles between them.

Figure 3:
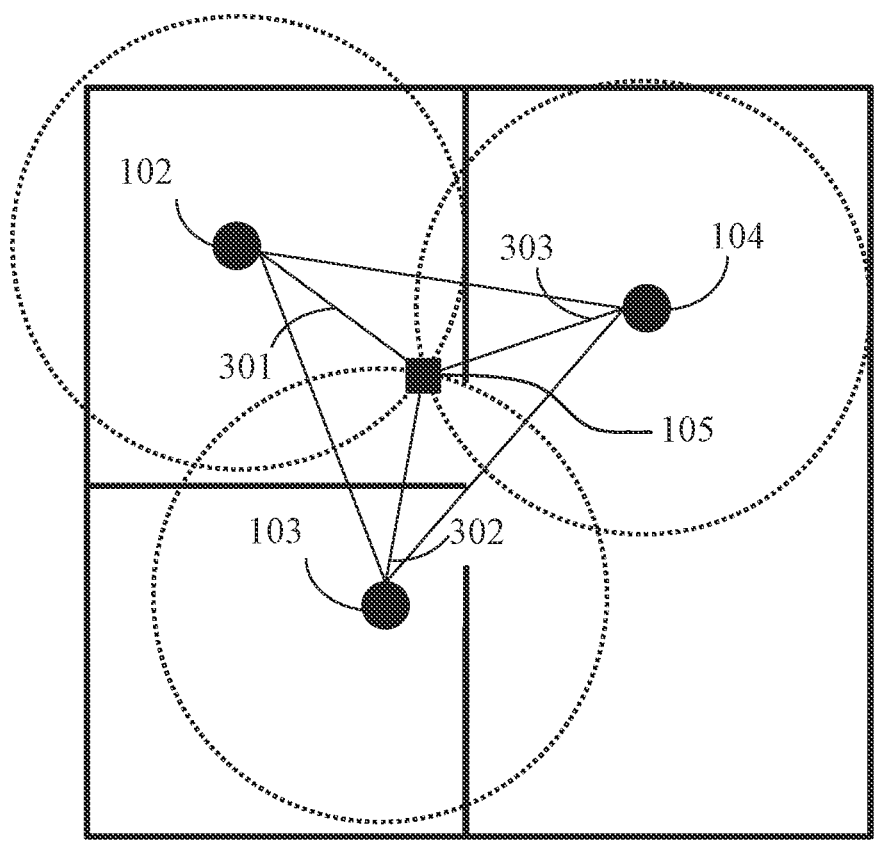
FIG. 3 is a schematic diagram showing a tracking device displayed on a map file according to the present application.

FIG. 3 is a schematic diagram showing a tracking device displayed on a map file according to the present application, The tracking device 105 of the object location identification system is used to periodically send tracking signals. The signal transceivers (102, 103, 104) respectively receive the tracking signals and accordingly obtain a second received signal strength indicator. For example, the signal transceiver 102 receives the tracking signal, and accordingly obtains a second received signal strength indicator d0, the signal transceiver 103 receives the tracking signal, and accordingly obtains a second received signal strength indicator d1; the signal transceiver 104 receives the tracking signal, and accordingly obtains a second received signal strength indicator d3. The signal transceivers 102, 103, and 104 send the second received signal strength indicators d0-d2 of the received tracking signal to the server 101.

The server 101 can calculate a relative distance between two points from the received signal strength indicators according to the physical formula of wireless signal attenuation upon a transmission distance. Accordingly, the server 101 obtains the relative distance 301 between the signal transceiver 102 and time tracking device 105 through the second received signal strength indicator d0, the relative distance 302 between the signal transceiver 103 and the tracking device 105 through the second received signal strength indicator d1, and the relative distance 303 between the signal transceiver 104 and the tracking device 105 through the second received signal strength indicator d2. Afterwards, the location information of the tracking device 105 is derived from the relative distances 301-303 using the trilateration positioning algorithm and the rotation axis formula, and the tracking device 105 can be located and found on the map file. When calculating the location of the tracking device 105, the server 101 performs a statistical analysis on a large amount of data. Such statistical analysis or means includes statistical quartile average, Kalman Filter, etc. They can be used to increase the accuracy of the identified location.

Figure 4:
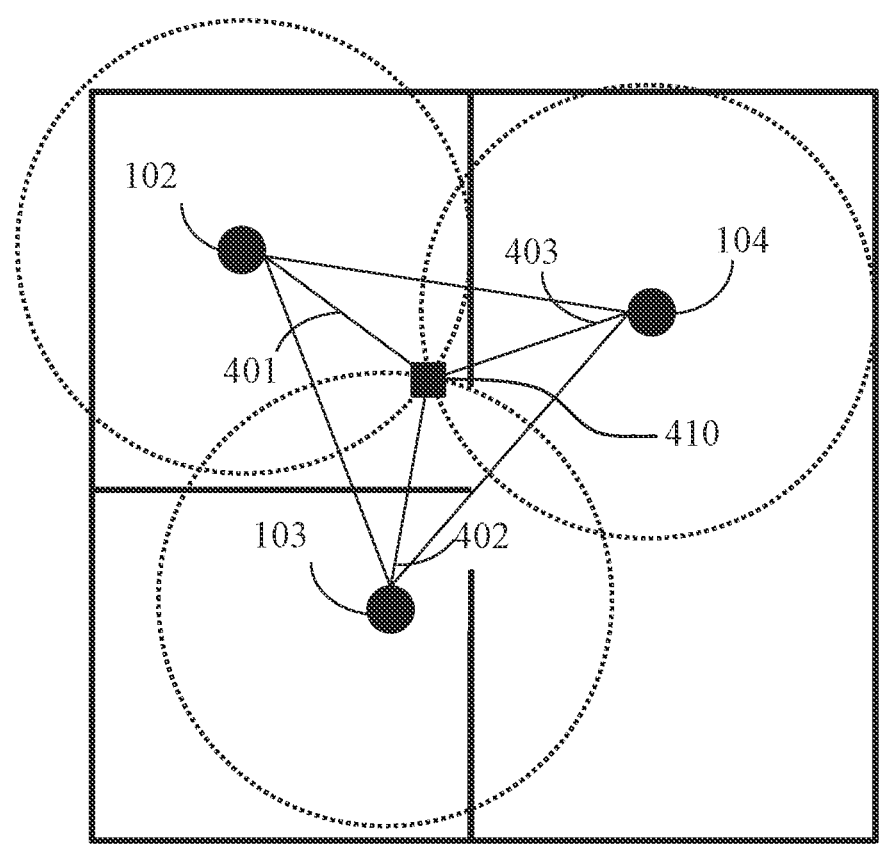
FIG. 4 is a schematic diagram showing a calibration device displayed on a map file according to the present application.

FIG. 4 is a schematic diagram. showing a calibration device displayed on a map file according to the present application. Also referring to FIGS. 2 and 3, in addition to the foregoing location method, a calibration device 410 with known position information can be further provided to the system. The calibration device 410 broadcasts a backward tracking signal. After the signal transceivers 102-104 receive the backward tracking signal, they respectively transmit the third received signal strength indicators corresponding to the received backward tracking signal to the server 101. The server 101 can obtain the relative distances 401-403 from the calibration device 410 respectively to the signal transceivers 102-104 based on the third received signal strength indicators in the foregoing similar manner, and further modifies the relative distances 201-203 among the signal transceivers 102-104.

In addition to the foregoing means for increasing the location accuracy, the signal transceivers provided by the present application may also have an antenna array which includes at least two antennas. The signal transceivers can obtain the angles of arrival (AoAs) of the reference signals or the AoAs of the tracking signal through the antennas. As discussed above, the signal strength can be used to determine the distance between two points. Furthermore, the AoA can be used to increase the accuracy of the identified location. Besides, if the AoAs of the backward tracking signal are well known among the calibration device 410 and the signal transceivers 102-104, the location arranged on the map file can be accordingly modified.

The tracking device provided by the present application further includes a motion sensing unit: for sensing whether the tracking device is in a static state or a motion state. If the tracking device changes from a motion state to a static state, it will send outwardly an enabling signal. On the contrary, if the tracking device changes from a static state to a motion state, it will send outwardly a disabling signal. The enabling signal or the disabling signal can be received by the signal transceivers and transmitted to the server. The server can determine whether the tracking device is in a static state or a motion state based on the signal generated by the motion sensing unit. When the tracking device is identified as being in the motion state, it temporally stops identifying the relative location of the tracking device. That is, the Kalman filter operation is reset or stopped. When the tracking device is considered as being from the motion state to the static state, the relative location of the tracking device is resumed to be identified, and simultaneously Kalman filter operation is performed again. This determination mechanism can enable the object location identification system provided by the present application to have a better stability while locating an object. When the location identification is performed on the moving tracking device, an incessant Kalman filter operation will reduce the accuracy of location. The foregoing identification mechanism does not require an incessant Kalman filter operation so that the convergence and stability of the location calculation are improved. In addition to increasing the stability, it can also achieve the effects of energy saving and reduction of network transmission. When the tracking device is in a motion state, the system does not need to continuously identify its location. When it is in a static state, the location is just identified so that the system can save the computing resources, thereby reducing the network traffic of this system. This mechanism allows the object location identification system provided by the present application to be used in various cloud systems such as a public cloud system that bills users upon its network traffic or is limited by its streaming speed. In this way, when the present application is applied to a public cloud system, it will not occupy too much network traffic of the public cloud system. In addition, in order to reduce the traffic demand, the time synchronization (e.g. through the network time protocol) between the signal transceivers is carried opt first. After the signal transceivers are synchronized on a time basis, each of the signal transceivers will send back the observation values of tracking devices after the same time interval so that the traffic of the public cloud is reduced. The server can adjust the interval. For example, it is set to 15 minutes. That is, each signal transceiver sends the observation value back to the server every 15 minutes.

The tracking device provided by the present application further includes a physiological detection unit for detecting the physiological signals of the user wearing the tracking device, such as heartbeat, blood pressure, body temperature, etc. In addition to a personnel positioning control, it can also be part of the nursing care system. For example, the tracking device can be a wristband worn on the hand of a patient suffering from Alzheimer's disease. The location of the patient is not only known, but the patient's activity can also be monitored.

Figure 5:
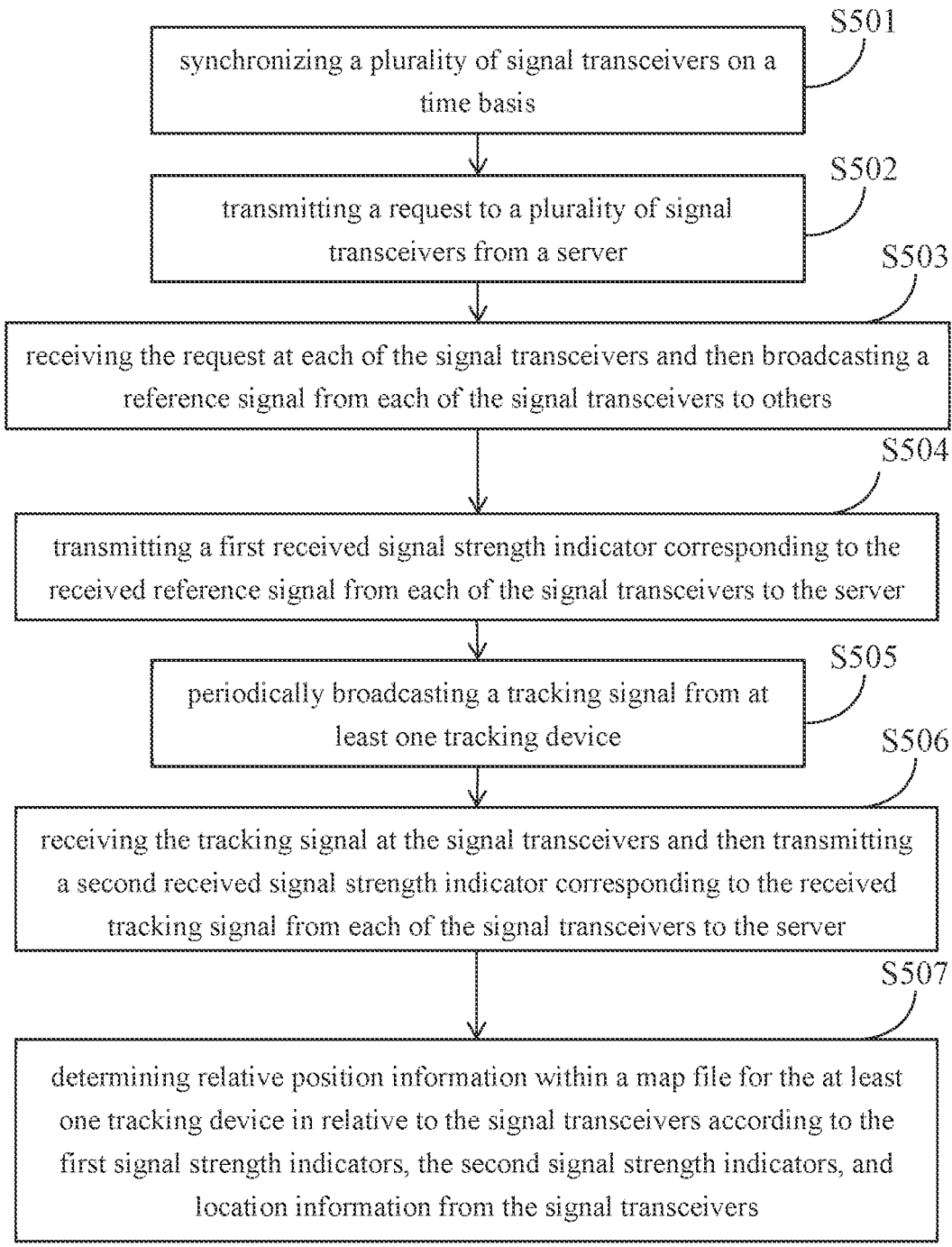
FIG. 5 is a schematic flow chart showing an object location identification method according to the present application.

Referring to FIG. 5, it is a schematic flow chart showing an object location identification method according to the present application. The method can be implemented by the object location identification system 100 shown in FIG. 1. In step S501, the time synchronization is performed between a plurality of signal transceivers. In step S502, the request and time interval are sent from the server to a plurality of signal transceivers. In step S503, after receiving the request, each signal transceiver broadcasts a reference signal to other signal transceivers. In step S504, each signal transceiver transmits the first received signal strength indicator corresponding to the received reference signal to the server. In step S505, a tracking signal is periodically broadcasted from at least one tracking device. In step S506, after each signal transceiver receives the tracking signal, it transmits the second received signal strength indication corresponding to the received tracking signal to the server at a time interval. In step S507, the server confirms the relative location information of the at least one tracking device with respect to each signal transceiver in the map file according to the first received signal strength indicator, the second received signal strength indicator, and the location information of each signal transceiver.

The present application uses a special algorithm to determine whether the tracking device is within the signal's acceptable range of the signal transceiver when confirming the location of the device in the map file. The method is calculated in the following way:

if $\Delta t > E + D \times E_M$, $E = E$, else if $E + D \times E_M \geq \Delta t > E$ $$E = \text{MIN}\left(E_M, \frac{\Delta t + E}{X}\right)$$

else if $E \geq \Delta t > \frac{E}{A}$ $$E = \text{MIN}\left(E_M, E + \frac{E_m}{c}\right),$$

else $$E = \text{MAX}\left(E_m, E - \frac{E - \Delta t}{B}\right)$$

where $\Delta t$ is a time interval;

E is a period when the signal transceivers do not detect a tracking device unit: sec);

$E_M$: is a maximum period when the signal transceivers do not detect the tracking devices (unit: sec);

$E_m$: is a minimum period when the signal transceivers do not detect the tracking devices (unit: sec);

A, B, C, D, and X are constant values obtained through several experiments, where A is between 0 and 1; the larger the value of B is, the less it is downward corrected; the larger the value of C is, the more it is upward adjusted, D is greater than 1, and X is greater than 1.

In an embodiment, A is 5, B is 50, C is 0.7, D is 2, and X is 1.5, and the derived $E_M$ is 240 and $E_m$ is 24. That is, if the signal transceiver does not detect the tracking device within 240 seconds, it can be determined that the tracking device has left the detectable range of the signal transceiver.

In another embodiment, A is 3, B is 25, C is 1.44, D is 2, and X is 1.5, and the derived $E_M$ is 210 and $E_m$ is 19. That is, if the signal transceiver does not detect the tracking device in 210 seconds, it can be determined that the tracking device has left the detectable range of the signal transceiver.

The foregoing embodiments of the invention have been presented for the purpose of illustration. Although the invention has been described by certain preceding examples, it is not to be construed as being limited by them. They are not intended to be exhaustive, or to limit the scope of the invention. Modifications, improvements and variations within the scope of the invention are possible in light of this disclosure.

What is claimed is:

1. A system for recognizing a location of a subject, comprising:
    a server for transmitting a request and storing a map file;
    a plurality of signal transceivers respectively communicating with the server to receive the request and broadcasting a reference signal to others of the signal transceivers, wherein location information of the signal transceivers is marked on the map file; and
    at least one tracking device bidirectionally communicating with the signal transceivers and periodically sending a tracking signal, wherein the at least one tracking device includes a motion sensing unit for sensing whether the at least one tracking device is in a static state or a motion state;
    wherein after each of the signal transceivers obtains a first received signal strength indicator corresponding to the received reference signal and a second received signal strength indicator corresponding to the received tracking signal, the each transmits the first signal strength indicator and the second signal strength indicator to the server, and the server determines relative position information for the at least one tracking device within the map file according to the first signal strength indicators, the second signal strength indicators, and location information of the signal transceivers;

wherein the server determines whether the at least one tracking device is in the static state or the motion state according to a signal generated from the motion sensing unit;

wherein the server temporally stops identifying a relative location of the at least one tracking device when the at least one tracking device is determined to be in the motion state so as to reduce network traffic and improve convergence and stability of location calculation by avoiding an incessant calculating operation;

wherein when the tracking device is determined to change from the motion state to the static state, the relative location of the at least one tracking device is resumed to be identified so as to improve convergence and stability of location calculation.

2. The system for recognizing the location of a subject according to claim 1, wherein each of the signal transceivers comprises an antenna array which includes at least two antennas.

3. The system for recognizing the location of a subject according to claim 2, wherein the signal transceivers obtain the angles of arrival (AoAs) of the reference signal or the AoAs of the tracking signal through the antennas.

4. The system for recognizing the location of a subject according to claim 1, wherein the tracking device further includes a physiological detection unit for detecting a physiological signal of a user wearing the tracking device.

5. The system for recognizing the location of a subject according to claim 1, wherein the server communicates with the signal transceivers using a public cloud.

6. A method for recognizing a location of a subject, comprising:

synchronizing a plurality of signal transceivers on a time basis;

transmitting a request to the plurality of signal transceivers from a server;

receiving the request at each of the signal transceivers and then broadcasting a reference signal from each of the signal transceivers to others;

transmitting a first received signal strength indicator corresponding to the received reference signal from each of the signal transceivers to the server;

periodically broadcasting a tracking signal from at least one tracking device;

receiving the tracking signal at the signal transceivers and then transmitting a second received signal strength indicator corresponding to the received tracking signal from each of the signal transceivers to the server; and determining relative position information within a map file for the at least one tracking device in relative to the signal transceivers according to the first signal strength indicators, the second signal strength indicators, and location information of the signal transceivers, wherein location information of the signal transceivers is marked on the map file;

sensing whether the at least one tracking device is in a static state or a motion state through a motion sensing unit;

temporally stopping identifying a relative loaction of the at least one tracking device when the at least one tracking device is determined to be in the motion state so as to reduce network traffic and improve convergence and stability of location calculation by avoiding an incessant calculating operation;

wherein when the tracking device is determined to change from the motion state to the static state, the relative location of the at least one tracking device is resumed to be identified so as to improve convergence and stability of location calculation.

7. The method for recognizing the location of a subject according to claim 6, wherein the signal transceivers obtain the angles of arrival (AoAs) of the reference signal or the AoAs of the tracking signal through an antennas array.

8. The method for recognizing the location of a subject according to claim 6, further comprising a step of providing a calibration device with known location information, and broadcasting a backward tracking signal from the calibration device.

9. The method for recognizing the location of a subject according to claim 8, further comprising a step of receiving the signal transceivers at the signal transceivers and then transmitting each third received signal strength indicator corresponding to the received backward tracking signal to the server.

10. The method for recognizing the location of a subject according to claim 9, further comprising a step of modifying at least one of the first signal strength indicators at the server according to the third received signal strength indicators.

11. The method for recognizing the location of a subject according to claim 6, wherein the step of determining relative position information further comprises: performing trilateral positioning calculations at the server to determine the relative position information for the at least one tracking device.

12. The method for recognizing the location of a subject according to claim 6, wherein the step of determining relative position information further comprises: performing a Kalman filter operation.

13. The method for recognizing the location of a subject according to claim 6, wherein the server communicates with the signal transceivers using a public cloud.

* * * * *